(12) United States Patent
Mentink et al.

(10) Patent No.: US 8,795,745 B2
(45) Date of Patent: *Aug. 5, 2014

(54) THERMOPLASTIC OR ELASTOMERIC COMPOSITIONS BASED ON ESTERS OF A STARCHY MATERIAL AND METHOD FOR PREPARING SUCH COMPOSITIONS

(75) Inventors: Leon Mentink, Lille (FR); Jacques Tripier, Labeuvriere (FR)

(73) Assignee: Roquette Freres, Lestrem (FR)

( * ) Notice: Subject to any disclaimer, the term of this patent is extended or adjusted under 35 U.S.C. 154(b) by 193 days.

This patent is subject to a terminal disclaimer.

(21) Appl. No.: 13/123,621

(22) PCT Filed: Oct. 13, 2009

(86) PCT No.: PCT/FR2009/051951
§ 371 (c)(1),
(2), (4) Date: Apr. 11, 2011

(87) PCT Pub. No.: WO2010/043813
PCT Pub. Date: Apr. 22, 2010

(65) Prior Publication Data
US 2011/0195148 A1    Aug. 11, 2011

(30) Foreign Application Priority Data

Oct. 13, 2008  (FR) ...................... 08 56937

(51) Int. Cl.
*A23G 4/00* (2006.01)
(52) U.S. Cl.
USPC .......... 426/3; 524/51; 524/55; 525/8; 523/128
(58) Field of Classification Search
USPC .......... 524/47, 48, 51, 55; 426/3; 525/7, 8, 10; 523/124, 128
See application file for complete search history.

(56) References Cited

U.S. PATENT DOCUMENTS

| | | |
|---|---|---|
| 3,666,492 A | 5/1972 | Teng et al. |
| 3,795,670 A | 3/1974 | Arthur et al. |
| 3,883,666 A | 5/1975 | Teng et al. |
| 4,035,572 A | 7/1977 | Stubits et al. |
| 4,041,179 A | 8/1977 | Stubits et al. |
| 4,873,270 A | 10/1989 | Aime et al. |
| 5,462,983 A | 10/1995 | Bloembergen et al. |
| 5,667,803 A | 9/1997 | Paronen et al. |
| 5,936,014 A | 8/1999 | Voigt et al. |
| 2002/0032254 A1 | 3/2002 | Haasmaa et al. |
| 2004/0166197 A1 | 8/2004 | Ribadeau-Dumas et al. |
| 2008/0146792 A1 | 6/2008 | Wang et al. |

FOREIGN PATENT DOCUMENTS

| | | |
|---|---|---|
| EP | 0 282368 A1 | 9/1988 |
| EP | 603 837 A1 | 6/1994 |
| EP | 638 609 A2 | 2/1995 |
| EP | 1 142 911 A1 | 10/2001 |
| EP | 1 440 621 A1 | 7/2004 |
| EP | 1 054 599 B1 | 9/2004 |
| WO | 95/04108 A1 | 2/1995 |
| WO | 97/03120 A1 | 1/1997 |
| WO | 98/07782 A1 | 2/1998 |
| WO | 98/29455 A1 | 7/1998 |
| WO | 98/29456 A1 | 7/1998 |
| WO | 00/73380 A1 | 12/2000 |

OTHER PUBLICATIONS

International Search Report, dated Jan. 11, 2010, from corresponding PCT application.

*Primary Examiner* — Frances Tischler
(74) *Attorney, Agent, or Firm* — Young & Thompson

(57) ABSTRACT

A thermoplastic or elastomeric composition, is characterized in that: a) it exhibits a degree of biodegradability of less than 50%, preferably less than 30%, and b) it contains at least 0.5% and at most 99.95% by weight of an ester of a starchy material, which has a degree of ester substitution (DS) of between 1.6 and 3, and at least 0.05% by weight and at most 99.5% by weight of a polymer other than starch.

14 Claims, No Drawings

THERMOPLASTIC OR ELASTOMERIC COMPOSITIONS BASED ON ESTERS OF A STARCHY MATERIAL AND METHOD FOR PREPARING SUCH COMPOSITIONS

The present invention relates to novel thermoplastic or elastomeric compositions, based on esters of a starchy material having a high degree of substitution (DS) of esters and on polymers other than starch.

The expression "thermoplastic or elastomeric composition" is understood within the present invention to mean a composition which, in a reversible manner, softens under the action of heat and hardens on cooling (thermoplastic) and/or resumes more or less rapidly its original shape and its starting dimensions after application of a strain under stress (elastomeric). It has at least one glass transition temperature ($T_g$) below which all or some of the amorphous fraction of the composition is in the brittle glassy state and above which the composition may undergo reversible plastic deformations. The glass transition temperature or one at least of the glass transition temperatures of the thermoplastic or elastomeric composition according to the present invention is preferably between −120° C. and +150° C.

This composition may in particular be thermoplastic, that is to say may exhibit an ability to be shaped by the processes conventionally used in plastics technology, such as extrusion, injection molding, molding, blow molding and calendering. Its viscosity, measured at a temperature of 100° C. to 200° C., is generally between 10 and $10^6$ Pa·s. This thermoplastic composition may then especially contain, in combination with at least one ester of a starchy material, at least one polymer other than starch chosen from the group of thermoplastic or thermosetting polymers such as, for example, polyolefins, polyvinyls, polystyrenes, acrylic and methacrylic polymers, polyamides, polycarbonates, linear polyesters, cellulose polymers, fluoropolymers, polysulfones, phenoplasts, aminoplasts, crosslinked polyesters, polyurethanes, polyepoxides, silicones, alkyds and polyimides.

The composition according to the invention may also be elastomeric, that is to say it may exhibit a high capacity for extensibility and for elastic recovery, like natural or synthetic rubbers. The elastomeric behavior of the composition may be obtained or adjusted by crosslinking or vulcanizing to a greater or lesser extent, after shaping in the plastic state. The expression "elastomeric composition" is also understood, within the meaning of the invention, to mean any composition of "thermoplastic elastomer" type, having both elastomeric and thermoplastic properties owing to a block polymer type structure with "soft" segments (glass transition temperature below ambient temperature) and hard segments (glass transition temperature above ambient temperature).

This type of composition may contain, in particular, in combination with at least one ester of starchy material, at least one polymer other than starch chosen from the group of natural or modified rubbers, polystyrene-based elastomers, polyester elastomers, polypropylene-based elastomers, silicone elastomers or rubbers and polyurethane elastomers.

Preferably, the thermoplastic or elastomeric composition according to the invention is a "hot-melt" composition, that is to say that it can be shaped without application of high shear forces, that is to say by simple flowing or by simple pressing of the molten material. Its viscosity, measured at a temperature of 100° C. to 200° C. is generally between 10 and $10^3$ Pa·s.

The thermoplastic or elastomeric composition according to the invention has the characteristics:
a) of having a low degree of biodegradability, that is to say of less than 50%, preferably of less than 30%; and
b) of containing:
   at least 0.5% and at most 99.95% by weight of an ester of a starchy material, having a degree of substitution (DS) of esters between 1.6 and 3; and
   at least 0.05% by weight and at most 99.5% by weight of a polymer other than starch,
   these percentages being relative to the total weight of the composition.

According to a first embodiment, the composition according to the invention is also characterized in that:
the ester of starchy material has, as is, a degree of biodegradability of less than 50%, preferably of less than 30%; and/or
the polymer other than starch has, as is, a degree of biodegradability of less than 50%, preferably of less than 30%.

According to one particularly advantageous embodiment, the composition according to the invention is characterized in that the ester of starchy material and the polymer other than starch each have a degree of biodegradability of less than 50%, preferably of less than 30%.

The expression "degree of biodegradability" within the meaning of the present invention is understood to mean the degree of aerobic biodegradation by the determination of the oxygen demand in a closed respirometer according to the ISO 14851:1999 international standard.

The specific procedure for the determination of this degree of biodegradability is described below.

Measurement of the Degree of Biodegradation According to ISO 14851

This is carried out in accordance with the ISO 14851 international standard (first edition 1999-05-15) entitled "Determination of the ultimate aerobic biodegradability of plastic materials in an aqueous medium—Method by measuring the oxygen demand in a closed respirometer", this being:
   according to the principle mentioned in paragraph 4 of said standard, the degree (or level) of biodegradation being determined by comparing the biological oxygen demand (BOD) with the theoretical oxygen demand (ThOD) and expressing it as a percentage;
   by calculating the ThOD according to Appendix A of said standard;
   by using a test environment, reactants, an apparatus and a procedure in accordance, respectively, with paragraphs 5, 6, 7 and 8 of said standard;
   by calculating, expressing and validating the results in accordance with paragraphs 9 and 10 of said standard.
In the present case, use was especially made of:
an inoculum in the form of activated sludge;
a standard test medium;
a test environment in darkness at 25° C. with an accuracy of ±1° C.;
microcrystalline cellulose powder as reference material.

According to one variant, the composition according to the invention has a degree of biodegradability as defined above which is extremely low, namely less than 20%, in particular less than 15%, or less than 10% or even 5%.

According to another variant, the composition according to the invention has a degree of biodegradability which remains low but which lies within higher ranges of values than the aforementioned values, namely a degree of biodegradability at least equal to 20% and less than 30%, in particular between 20 and 28%.

In the current context of climatic disturbances due to the greenhouse effect and to global warming, of the upward trend in the costs of fossil raw materials, in particular of oil from which plastics are derived, of the state of public opinion in search of sustainable development, of products that are more natural, cleaner, healthier and more energy efficient, and of the change in regulations and tax systems, it is necessary to have available novel compositions resulting from renewable resources which are suitable in particular for the fields of plastics and elastomers, and which are simultaneously competitive, designed from the outset to have only few or no negative impacts on the environment and technically as effective as the polymers prepared from raw materials of fossil origin.

Starch constitutes a raw material that has the advantages of being renewable and available in large amounts at a price which is economically advantageous in comparison with oil and gas, that are used as raw materials for current plastics.

Starch has already been made use of in the manufacture of plastics, in particular due to its property of also being a biodegradable product.

The first starch-based compositions were developed approximately thirty years ago. The starches were then used in the form of mechanical mixtures with synthetic polymers such as polyethylene, as filler, in the granular and non-modified native state, that is to say in the state in which it is present in nature.

Subsequently, starch was used in the manufacture of biodegradable articles, but in a state rendered essentially amorphous and thermoplastic. This destructured state with reduced or no crystallinity, is obtained by plasticization of the granular native starch by incorporation of a suitable plasticizer in an amount generally between 15 and 25% relative to the granular starch, by contributing mechanical and thermal energy.

However, the mechanical properties of thermoplastic starches, although they can to a certain extent be adjusted by the choice of the starch, of the plasticizer and of the level of use of the latter, are overall fairly mediocre since the materials thus obtained are always very highly viscous, even at high temperature (120° C. to 170° C., and very frangible, too brittle, very hard and not very film-forming at low temperature, that is to say below the glass transition temperature.

Therefore, numerous research studies have been carried out targeted at developing biodegradable or water-soluble formulations exhibiting better mechanical properties by physical mixing of these thermoplastic starches, either with biodegradable polymers of petroleum origin (polycaprolactones or PCLs, aromatic copolyesters or PBATs, aliphatic polyesters or PBSs) or water-soluble polymers (polyvinyl alcohols or PVOHs), or with polyesters of renewable origin such as polylactates (PLAs), microbial polyhydroxyalkanoates (PHAs) or else cellulose derivatives.

The water resistance of these biodegradable compositions or moreover of water-soluble compositions is generally poor and insufficient to entertain the possibility of manufacturing articles and any products with long or moderate service lives such as automotive parts for example. Furthermore, the physicochemical stability of these compositions is, in this case, also a factor that greatly limits the potential uses.

After having studied the problem in detail, the Applicant surprisingly observed that it was possible to prepare thermoplastic or elastomeric compositions of low or very low biodegradability but also of great stability in water and over time, which may be of use in the production of articles with long service lives or that need to be stable in aqueous or biological media, by using esters of a starchy material having a high to very high degree of substitution (DS) of esters, even by combining them with polymers known for being highly biodegradable.

The present invention provides an effective solution to the aforementioned problems by proposing novel compositions based on an ester of starchy material, moreover having improved properties with respect to those of the prior art.

Regardless of the variant envisaged above, the thermoplastic or elastomeric composition according to the invention advantageously comprises an ester of starchy material having a high or very high DS. The DS may especially be between 1.8 and 3, preferably between 2.0 and 2.9 and more preferably still between 2.5 and 2.9, a DS between 2.6 and 2.8 being ideally used.

Regardless of the variant envisaged, the thermoplastic or elastomeric composition according to the invention advantageously comprises:
  from 5 to 99% by weight of an ester of a starchy material as described above; and
  from 1 to 95% by weight of a polymer other than starch, these percentages being relative to the total weight of the composition.

According to another variant, the thermoplastic or elastomeric composition according to the invention advantageously comprises:
  from 10 to 70% by weight, preferably from 10 to 60% by weight, of an ester of a starchy material; and
  from 30 to 90% by weight, preferably from 40 to 90% by weight, of a polymer other than starch, these percentages being relative to the total weight of the composition.

Its content of ester of a starchy material may especially be between 10 and 55%.

Its content of polymer other than starch may especially be between 45 and 90%, in particular between 45 and 85%.

According to another variant, the ester of a starchy material is the main, or even majority, component of the composition according to the invention, which composition may then especially be characterized in that it comprises from 50 to 99%, preferably from 51 to 98% by weight of said ester.

At the same time, the polymer other than starch (or "non-starchy polymer") is then neither the main component nor the majority component of the composition according to the invention, which composition may then especially be characterized in that it comprises from 1 to 49% by weight, preferably from 2 to 40% by weight and more preferably still from 2 to 35% by weight of said polymer.

According to another variant, the ester of a starchy material is not the majority component and generally not the main component of the composition according to the invention, which composition may then especially be characterized in that it comprises at most 49.5% and in particular from 5 to 49%, preferably from 7 to 49% by weight and more preferably still from 10 to 49% by weight of said ester.

At the same time, the polymer other than starch may then be the main component or even the majority component of the composition according to the invention, which composition may then especially be characterized in that it comprises at least 40% and up to 95% by weight of said polymer and in particular from 50 to 95%, preferably from 51 to 93% by weight and more preferably still from 51 to 90% by weight of said polymer.

Regardless of the variant envisaged above, the ester of the starchy material with a DS between 1.6 and 3 may be present in the composition according to invention in any form, in particular in the dispersed state in the form of micron-sized or nanometer-sized fibers or other particles in the non-starchy polymer or in the state of a thermoplastic or elastomeric, continuous, discontinuous or co-continuous phase that is compatibilized with the non-starchy polymer to a greater or lesser extent.

Moreover, the non-starchy polymer may also be present in the composition according to the invention in any form, in particular in the dispersed state in the form of fibers in the ester of the starchy material or in the state of a thermoplastic or elastomeric, continuous, discontinuous or co-continuous phase that is compatibilized with the ester of the starchy material to a greater or lesser extent.

To the best knowledge of the Applicant, the use of esters of starchy material, in particular with high or very high DSs, has only been recommended for:

the manufacture of thermoplastic compositions that are said to be biodegradable that furthermore contain or do not contain at least one non-starchy polymer known for being itself biodegradable or water soluble such as for example a) modified celluloses, b) proteins, c) biodegradable polyesters, especially of hydroxycarboxylic type as described in patents U.S. Pat. No. 5,462,983, WO 95/04108, EP 1 054 599 or EP 1 142 911 or polyalkylene carbonates as described in patents U.S. Pat. No. 5,936,014 or WO 98/07782 and d) water-soluble polymers such as those described in patents EP 638 609, U.S. Pat. No. 5,936,014, US 2002/0032254 or WO 00/73380; or the manufacture of elastomeric compositions that can be used as gum bases for chewing gums free of a) any non-starchy polymer, whether thermoplastic or elastomeric, and b) any plasticizer of the ester of starchy material, as described for example in patents U.S. Pat. Nos. 3,666,492, 4,035,572 or 4,041,179.

In the context of the present invention, the expression "starchy material" is understood to mean any oligomer or polymer of D-glucose units bonded together by alpha-1,4 bonds and optionally by other bonds, of alpha-1,6, alpha-1,2, alpha-1,3 or other type.

This starchy material may originate from any type of starch and in particular be chosen from the starches of cereal plants such as wheat, corn, barley, triticale, sorghum or rice; the starches of tubers such as potato or cassava; the starches of leguminous plants such as peas, soybeans or beans, the amylase-rich starches or conversely amylopectin-rich ("waxy") starches resulting from these plants or any mixtures of these starches.

According to the invention, this starchy material may preferably have a molecular weight between $10^3$ and $10^8$ g/mol, better still between $5.10^3$ and $10^7$ g/mol and even better still between $10^4$ and $10^6$ g/mol.

According to a first embodiment, this starchy material may result from the esterification, to a high degree, of a granular, optionally hydrolyzed and/or modified, starch.

The expression "granular starch" is understood here to mean a native starch or a starch which has been modified physically, chemically or enzymatically and which has retained, within the starch granules, a semi-crystalline structure similar to that demonstrated in the starch grains present naturally in the storage tissues and organs of higher plants, in particular in the seeds of cereal plants or of leguminous plants, tubers, roots, bulbs, stems and fruits. This semi-crystalline state is essentially due to the macro-molecules of amylopectin, one of the two main constituents of starch. In the native state, starch grains have a degree of crystallinity which varies from 15 to 45%, and which essentially depends on the botanical origin of the starch and on the optional treatment that it has undergone.

Starch in the granular state, placed under polarized light, exhibits a characteristic black cross, referred to as a Maltese cross, typical of this state.

According to one variant, the ester of the starchy material originates from granular starch hydrolyzed via an acid, oxidizing or enzymatic route. Such starches are commonly referred to as fluidized starches, oxidized starches or white dextrins.

According to another variant, it may originate from the esterification of a starch that has essentially retained the granular structure of the native starch but has been modified physicochemically, such as especially weakly esterified and/or etherified starches, in particular that are modified by acetylation, hydroxypropylation, cationization, crosslinking, phosphation, or succinylation, or the starches treated in an aqueous medium at low temperature ("annealing" treatment).

The ester of the starchy material may especially result from the esterification of a hydrolyzed, oxidized or modified granular starch, in particular of corn, wheat, potato or pea.

According to a second embodiment, the starchy material selected for the preparation of the composition according to the invention, originates from the esterification, to a higher degree, of a non-granular starch, that is to say a starch lacking starch grains that exhibit, in microscopy and under polarized light, a Maltese cross. It will then be a water-soluble starch or an organomodified starch, which may also originate from any botanical origin, including an amylose-rich starch or conversely an amylopectin-rich (waxy) starch.

According to a first variant, the ester of the starchy material with a DS between 1.6 and 3 is a water-soluble non-granular starch ester. Within the meaning of the invention, the expression "water-soluble starch" is understood to mean any starchy material having, at 20° C. and under mechanical stirring for 24 hours, a fraction that is soluble in demineralized water at least equal to 5% by weight.

The water-soluble starch may advantageously be chosen from pregelatinized starches, extruded starches, spray-dried starches, dextrins, maltodextrins, functionalized starches or any mixtures of these products, optionally plasticized.

The pregelatinized, extruded or spray-dried starches may be obtained by hydrothermal gelatinization treatment of native starches or modified starches, in particular by steam cooking, jet-cooker cooking, cooking on a drum, cooking in kneader/extruder systems and then drying, for example in an oven, with hot air on a fluidized bed, on a rotating drum, by spray drying, by extrusion, by precipitation by a non-solvent, or by lyophilization, of a starchy solution or suspension. Mention may be made, by way of example, of the products manufactured and sold by the Applicant under the PREGEFLO® trade name.

The dextrins may be prepared from native or modified starches by dextrinization in a relatively anhydrous acidic medium. They may in particular be soluble white dextrins or be yellow dextrins. Mention may be made, by way of example, of the products STABILYS® A 053 or TACKIDEX® C 072 manufactured and sold by the Applicant.

The maltodextrins may be obtained by acid, oxidizing or enzymatic hydrolysis of starches in an aqueous medium. They may in particular exhibit a dextrose equivalent (DE) of between 0.5 and 40, preferably between 0.5 and and better still between 0.5 and 12. Such maltodextrins are, for example, manufactured and sold by the Applicant under the GLUCIDEX® trade name.

The functionalized starches may be obtained in particular by acetylation in an aqueous phase with acetic anhydride, mixed anhydrides, hydroxypropylation, cationization, anionization, phosphation or succinylation. These functionalized starches may exhibit a degree of substitution of between 0.01 and 2.7 and better still of between 0.05 and 1.

The water-soluble starch is preferably a water-soluble corn, wheat, potato or pea starch or a water-soluble derivative thereof.

According to a second variant, the esterified starchy material with a DS of between 1.6 and 3 is an ester of an organomodified starch, preferably an organosoluble starch, which may also originate from any botanical origin. Within the meaning of the invention, the expression "organomodified starch" is understood to mean any starchy component other than a granular starch or a water-soluble starch according to the definitions given above. Preferably, this organomodified starch is virtually amorphous, that is to say exhibits a degree of starch crystallinity of less than 5%, generally of less than 1%, and in particular a zero degree of starch crystallinity. It is also preferably "organosoluble", that is to say exhibits, at 20° C., a fraction at least equal to 5% by weight that is soluble in a solvent chosen from ethanol, ethyl acetate, propyl acetate, butyl acetate, diethyl carbonate, propylene carbonate, dimethyl glutarate, triethyl citrate, dibasic esters, dimethyl sulfoxide (DMSO), dimethyl isosorbide, glycerol triacetate, isosorbide diacetate, isosorbide dioleate and methyl esters of vegetable oils. Of course, the organosoluble starch may be completely soluble in one or more of the solvents indicated above.

The organomodified starch may be prepared from native or modified starches, such as those presented above, by esterification or etherification to a sufficiently high level to render it essentially amorphous and to confer on it an insolubility in water and preferably a solubility in one of the above organic solvents.

The organomodified starch may be obtained in particular by grafting of oligomers of caprolactones or of lactides, by hydroxypropylation and crosslinking, by cationization and crosslinking, by anionization, phosphation or succinylation and crosslinking, by silylation, or by telomerization with butadiene. These organomodified, preferably organosoluble, starches may exhibit a degree of substitution (DS) of between 0.01 and 2.7, preferably of between 0.05 and 2.0 and in particular of between 0.1 and 1.5.

The organomodified starch is preferably an organo-modified corn, wheat, potato or pea starch or an organomodified derivative thereof.

The esterifying agent used for the preparation of the ester of the starchy material may be an organic acid anhydride, an organic acid, a mixed anhydride, an organic acid chloride or any mixture of these products. This esterification agent may be chosen from saturated or unsaturated acids having from 2 to 24 carbon atoms, and more specifically from acetic acid, propionic acid, butyric acid, valeric acid, hexanoic acid, heptanoic acid, pelargonic acid, octanoic acid, decanoic acid, undecanoic acid, lauric acid, myristic acid, palmitic acid, oleic acid, stearic acid, anhydrides of these acids, mixed anhydrides of these acids, and any mixtures of these products.

The ester of the starchy material with a degree of substitution (DS) between 1.6 and 3.0, preferably between 1.8 and 3.0, more preferably between 2.0 and 2.9, in particular between 2.5 and 2.9 and ideally between 2.6 and 2.8 is preferably an ester of a water-soluble starch or of an organomodified starch, preferably an ester of a pregelatinized starch, of an extruded starch, of a spray-dried starch, of a dextrin, of a maltodextrin, of a functionalized starch, of an organosoluble starch, or of any mixture of these products, optionally plasticized.

Preferably, said ester of the starchy material bears chains having 2 to 22 carbon atoms and is an acetate, a propionate, a butyrate, a valerate, a hexanoate, an octanoate, a decanoate, a laurate, a palmitate, an oleate or a stearate of starch, of dextrin or of malto-dextrin, pure or as a mixture. Preferably, it is an acetate of starchy material. The composition according to the invention comprises in particular as ester of starchy material, an ester with a DS within any one of the aforementioned ranges, preferably of acetate type, of water-soluble or organomodified starch, especially of pregelatinized, extruded or spray-dried starch, of dextrin, of maltodextrin, of functionalized starch or of organosoluble starch.

Very advantageously, the ester of the starchy material is an acetate of water-soluble or organomodified starch, an acetate of dextrin or an acetate of maltodextrin.

The ester of the starchy material may be mixed in any proportions with an optionally hydrolyzed and/or modified granular starch, with a water-soluble starch or with an organomodified starch, as defined above.

As regards the esterification conditions, a person skilled in the art will easily be able to refer, with regard to the esterifying agent used, to the techniques and conditions described in the literature, in particular in patents U.S. Pat. No. 3,795,670, EP 603 837, U.S. Pat. No. 5,667,803, WO 97/03120, WO 98/29455, WO 98/98/29456 and US 2008/0146792.

The esterification may be obtained in particular by acetylation in solvent phase, in organic acid medium, in the presence of the anhydride or of a mixed anhydride of this organic acid and of an acid catalyst.

The esterified starchy material may bear other groups, introduced by grafting, for example, of oligomers of caprolactones or of lactides, or introduced by hydroxypropylation, crosslinking, cationization, anionization, succinylation, silylation or telomerization.

The thermoplastic or elastomeric composition according to the invention also comprises at least one polymer other than starch (also referred to as "non-starchy polymer").

The non-starchy polymer may be of any chemical nature. It may be thermoplastic or thermosetting polymers or thermoplastic elastomers. It advantageously comprises functional groups having active hydrogen and/or functional groups which give, in particular by hydrolysis, such functional groups having active hydrogen.

It may be a polymer of natural origin, or else a synthetic polymer obtained from monomers of fossil origin and/or monomers resulting from renewable natural resources.

The polymers of natural origin may be, in particular, obtained directly by extraction from plants or animal tissues. They are preferably modified or functionalized, and in particular are chosen from polymers of protein, cellulose or lignocellulose nature, chitosans and natural rubbers. They may also be polymers obtained by extraction from microorganism cells, such as polyhydroxyalkanoates (PHAs).

Such a polymer of natural origin can also be chosen from flours or proteins that are preferably modified; celluloses that are unmodified or modified in particular by carboxymethylation, ethoxylation, hydroxypropylation, cationization, acetylation or alkylation; hemicelluloses; lignins; modified or unmodified guar gums; chitins and chitosans; natural gums and resins such as natural rubbers (NRs) and derivatives thereof, rosins, shellacs, terpene resins and bitumens; polysaccharides extracted from algae such as alginates and carrageenans; polysaccharides of bacterial origin such as xanthans or gellans; lignocellulose fibers such as flax, hemp or coir fibers or fibers of other natural origin.

The non-starchy polymer may be synthetic and obtained in particular by polymerization, polycondensation or polyaddition.

Very preferably, the non-starchy polymer has, as is, a degree of biodegradability of less than 50%, preferably of less than 30%. Therefore, when it is used as the sole non-starchy polymer, this polymer is preferably chosen from polymers other than biodegradable polyesters such as polyhydroxy acids (for instance PLA, PGA, PHA, PHB, PHV, PHBV or PCL), polyesteramides (for instance BAK) or aromatic or aliphatic copolyesters (for instance PBS and PBAT), other than polyalkylene carbonates (for instance PEC and PPC) and other than water-soluble polymers such as polyvinyl alcohols, ethylene/vinyl alcohols, proteins, celluloses and derivatives thereof.

It can be chosen in particular from thermoplastic polymers such as polyolefins, in particular polyethylene, polypropylene, polyisobutylene and copolymers thereof, vinyl polymers, styrenic polymers or styrenic copolymers (ABS, SAN, MBS), acrylic or methacrylic polymers, polyoxyphenylenes, polyacetals, polyamides, polycarbonates having a degree of biodegradability of less than 50%, preferably of less than 30%, polyesters having a degree of biodegradability of less than 50%, preferably of less than 30%, such as polyethylene terephthalates (PETs), including amorphous polyethylene terephthalates (PETGs), fluoropolymers, polysulfones, polyphenylene sulfides (or polyphenyl sulfides), polyurethanes, polyepoxides, silicones, alkyds and polyimides, functionalized variants thereof and any mixtures of the aforementioned polymers.

Mention may be made, as thermoplastic non-starchy polymers that can very particularly be used according to the invention, of polyethylene terephthalates (PETs), including amorphous polyethylene terephthalates (PETGs), functionalized or non-functionalized polyethylenes (PEs) and polypropylenes (PPs), polyacrylonitriles (PANs), polyethersulfones, polymethyl methacrylates (PMMAs), polyamides, in particular polyamides PA-6, PA-6,6, PA-6,10 and PA-6,12, polyacrylates, polyvinyl acetates, polyurethanes, polyoxymethylenes (POMs) and any mixtures of these polymers.

The polymer other than starch may also and preferably be chosen from elastomeric polymers such as synthetic rubbers (SRs) such as butyl rubbers (in particular halogenated butyl rubbers such as bromobutyl and chlorobutyl rubbers); polyacrylate rubbers (ACMs); nitrile rubbers (in particular carboxylated nitrile rubbers); polybutadienes (BRs) and polyisoprenes; mixed elastomers based on butadiene, isoprene and/or styrene, in particular based on styrene and butadiene (SBS or SBR), on styrene and isoprene (SIS), on styrene and polyolefin; thermoplastic elastomers (TPEs) in the form of multiblock copolymers composed of hard blocks in particular of styrene, urethane, or polyamide type and soft blocks in particular of polyether, polyester, polybutadiene, polyethylene, polyisoprene or polybutylene type (for example TPS, TPU or PEBA); elastomers based on ethylene (ethylene acrylates or EAMs), or on polypropylene (ethylene-propylene-diene monomer or EPDM) or on ethylene and propylene (EPM); semicrystalline elastomers based on polyolefins; silicone rubbers such as methylsilicones (in particular phenyl, vinyl and fluoro silicones) and polysiloxanes (polydimethylsiloxanes); physical mixtures or alloys between thermoplastic polymers and elastomers such as polypropylenes (PPs) or polyvinyl chloride (PVC) dispersed in which are elastomers that are non-vulcanized, partially vulcanized or completely vulcanized, such as rubbers (PP/NR, PP/NBR-VD, PVC/NBR and TPO) or EPDM (PP/EPDM-VD).

Particularly advantageously, the elastomeric non-starchy polymer has a glass transition temperature ($T_g$) between −5 and −120° C., preferably between −10 and −105° C. and more preferably between −20 and −80° C.

As elastomeric non-starchy polymer, the following may very particularly be recommended, in particular natural rubbers and derivatives thereof, polyisobutylenes, polyisoprenes, butadiene-styrene copolymers (SBRs), optionally hydrogenated butadiene-acrylonitrile copolymers (NBRs and H-NBRs), acrylonitrile-styrene-acrylate copolymers (ASAs), ethylene/methyl acrylate copolymers (EAMs), thermoplastic polyurethanes (TPUs) of ether or ester-ether type, polyethylenes or polypropylenes functionalized, for example, by silane, halogenated, acrylic or maleic anhydride units, EDMs and EPDMs, thermoplastic elastomers derived from polyolefins (TPOs), styrene-butylene-styrene copolymers (SBSs) and styrene-ethylene-butylene-styrene copolymers (SEBSs) functionalized, for example, by maleic anhydride units, and any mixtures of these polymers.

Preferably, all or part of the thermoplastic or elastomeric non-starchy polymer is synthesized from monomers derived from rapidly renewable natural resources such as plants, microorganisms or gases, in particular from sugars, glycerol, oils or derivatives thereof such as monofunctional, difunctional or polyfunctional alcohols or acids. All or part of the non-starchy polymer may in particular be synthesized from bio sourced monomers such as bio-ethanol, bio-ethylene glycol, bio-propanediol, bio sourced 1,3-propanediol, bibutanediol, lactic acid, bio sourced succinic acid, glycerol, isosorbide, sorbitol, sucrose, diols derived from vegetable or animal oils and pine-extracted resin acids and also derivatives thereof.

All or part of the non-starchy polymer may especially be polyethylene resulting from bio-ethanol, PVC resulting from bio-ethanol, polypropylene resulting from bio-propanediol, polyesters of PLA or PBS type based on biosourced lactic acid or on biosourced succinic acid, polyesters of PBAT type based on biosourced butanediol or on biosourced succinic acid, polyesters of SORONA® type based on biosourced 1,3-propanediol, polycarbonates comprising isosorbide, polyethylene glycols based on bio-ethylene glycol, polyamides based on castor oil or on plant diols, and polyurethanes based, for example, on plant diols or plant polyols, which are short or long, such as glycerol, isosorbide, sorbitol or sucrose, and/or based on fatty acids which are optionally hydroxyalkylated.

In any case and as already specified, very preferably the non-starchy polymer has, as is, a degree of biodegradability of less than 50%, preferably of less than 30%.

According to another advantageous variant, the non-starchy polymer has a low solubility in water, namely of less than 10% (less than 10% of material soluble in water at 20° C.) and in particular of less than 5%. It is preferably insoluble in water (less than 0.1% of material soluble in water at 20° C.)

According to another variant, the non-starchy polymer has a weight-average molecular weight between 8500 and 10 000 000 daltons, in particular between 15 000 and 1 000 000 daltons.

Furthermore, the non-starchy polymer is preferably composed of carbon of renewable origin within the meaning of the ASTM D6852 standard and is advantageously non-biodegradable or non-compostable within the meaning of the EN 13432, ASTM D6400 and ASTM 6868 standards.

The incorporation of the non-starchy polymer into the ester of the starchy material in the composition according to the invention may preferably be carried out by hot kneading at a temperature between 35 and 300° C., in particular between 60 and 200° C., and better still from 100 to 180° C. This incorporation may be carried out by thermomechanical mixing, in a batchwise manner or continuously and in particular in-line. In this case, the mixing time may be short, from a few seconds to a few minutes.

According to a preferred variant, the thermoplastic or elastomeric composition according to the invention may be plasticized and comprise a plasticizer.

The expression "plasticizer" or "plasticizing agent" is understood to mean any molecule of low molecular weight, that is to say preferably having a molecular weight of less than 5000, which, when it is incorporated into the composition according to the invention, especially via a thermomechanical treatment at a temperature generally at least equal to 35° C., preferably between 35° C. and 300° C., in particular between 60° C. and 260° C. and better still between 65° C. and 200° C., results in a reduction of the glass transition temperature of the composition according to the invention or of that of the ester of the starchy material and/or a change in the crystallinity thereof.

When the term "plasticized" is used in the present invention in relation to "starchy material" this inevitably implies the presence of a plasticizing agent. The esterified starchy material may contain an amount of one or more compounds appearing in the list of the plasticizing agents below, which may include water, in particular.

The plasticizing agent may in particular be chosen from water, esters and ethers of diols, triols and polyols that are glycerol, polyglycerols, isosorbide, sorbitans, sorbitol, mannitol, and hydrogenated glucose syrups, esters of organic acids, urea and any mixtures of these products. The plasticizing agent may in particular be chosen from methyl, ethyl or fatty esters of organic or inorganic acids such as lactic, citric, succinic, adipic, sebacic, phthalic, glutaric or phosphoric acids or acetic or fatty esters of monoalcohols, diols, triols or polyols such as ethanol, diethylene glycol, glycerol or sorbitol. By way of example, mention may specifically be made of glycerol diacetate (diacetin), glycerol triacetate (triacetin), isosorbide diacetate, isosorbide dioctanoate, isosorbide dioleate, isosorbide dilaurate, esters of dicarboxylic acids or dibasic esters (DBEs) and any mixtures of these products. The plasticizing agent may also be an epoxidized vegetable oil, a glycol or derivative such as an ethylene glycol polyester.

The plasticizer may also be chosen from the aforementioned products coupled together by coupling agents such as epichlorohydrin or an isocyanate.

According to another variant, the plasticizing agent is characterized by its solubility parameter (referred to as HILDEBRAND solubility) which in fact expresses the attractive force that exists between the molecules of said plasticizer and of any polymer (of starchy or non-starchy nature) present in the composition according to the invention, and more particularly the variation in the cohesive energy density of the plasticizer, i.e. the energy needed to vaporize it. The units of the solubility parameter are then expressed at 25° C. and in $(J.cm^{-3})^{0.5}$ or in $(MPa)^{1/2}$ (where $1 (J.cm^{-3})^{0.5}=1 (MPa)^{1/2}$).

The plasticizing agent optionally used may especially have a solubility parameter between 15 and 28 $(J.cm^{-3})^{0.5}$, preferably between 17 and 25 $(J.cm^{-3})^{0.5}$, and preferably still between 18 and 22 $(J.cm^{-3})^{0.5}$. It may be, for example, glycerol triacetate (triacetin), the HILDEBRAND parameter of which, calculated from its latent heat of vaporization (85.74 kJ/mol) or from its boiling point (259° C.) is 21 $(J.cm^{-3})^{0.5}$.

According to another variant, the plasticizer optionally used advantageously has a molecular weight of less than 1500, in particular of less than 500. The plasticizing agent preferably has a molecular weight greater than 18, in other words it preferably does not include water. Ideally, the plasticizing agent has a molecular weight between 150 and 450.

The plasticizing agent may especially have, at the same time, such as for example triacetin (molecular weight of 218):
  a molecular weight between 150 and 450; and
  a HILDEBRAND parameter between 18 and 22 $(J.cm^{-3})^{0.5}$.

When the starchy composition contains a plasticizing agent, said plasticizing agent is preferably present in an amount of 1 to 150 parts by dry weight, preferably in an amount of 10 to 120 parts by dry weight and in particular in an amount of 25 to 120 parts by dry weight, per 100 parts by dry weight of ester of the starchy material.

According to one preferred embodiment, when the composition according to the invention contains a plasticizing agent, in particular a plasticizing agent of the ester of the starchy material, said composition comprises from 2 to 40% by weight, preferably from 4 to 35% by weight and in particular from 5 to 30% by weight, of said plasticizing agent.

Particularly advantageously, the thermoplastic or elastomeric composition according to the invention may be characterized in that it comprises:
  from 10 to 60% by weight of an ester of a starchy material;
  from 40 to 85% by weight of a polymer other than starch; and
  from 5 to 30% by weight of a plasticizing agent.

The optional but preferred incorporation of a plasticizer may be carried out cold, for example by mixing at ambient temperature with the ester of the starchy material or else directly during the preparation of the thermoplastic or elastomeric composition according to the invention, that is to say hot, at a temperature preferably between 60 and 200° C., more preferably between 100 and 180° C., in batch mode, for example by kneading/mixing, or continuously, for example by extrusion. The duration of this mixing may range from a few seconds to a few hours, depending on the mixing method used.

According to another variant, the composition according to the invention is characterized in that the starchy material used for the preparation of the ester contained in the composition has a degree of crystallinity of less than 15%, preferably of less than 5% and more preferably of less than 1%. This degree of crystallinity of the starchy material may in particular be measured by the X-ray diffraction technique as described in patent U.S. Pat. No. 5,362,777 (column 9, lines 8 to 24).

The composition according to the invention may also comprise a coupling agent.

The expression "coupling agent" is understood within the present invention to mean any organic molecule bearing at least two free or masked functional groups capable of reacting with molecules bearing functional groups having an active hydrogen such as, for example, those of the ester of the starchy material or the plasticizer. This coupling agent may be added to the composition in order to enable the attachment, via covalent bonds, of at least one part of the plasticizer to the ester of the starchy material and/or to the non-starchy polymer added. It may optionally also be added as a crosslinking or vulcanization agent.

This coupling agent may then be chosen, for example, from compounds bearing at least two identical or different, free or masked, functional groups chosen from isocyanate, carbamoylcaprolactam, aldehyde, epoxide, halo, protonic acid, acid anhydride, acyl halide, oxychloride, trimetaphosphate or alkoxysilane functional groups and combinations thereof.

It may advantageously be chosen from the following compounds:
  diisocyanates, preferably methylene diphenyl diisocyanate (MDI), toluene diisocyanate (TDI), naphthalene diisocyanate (NDI), hexamethylene diisocyanate (HMDI) and lysine diisocyanate (LDI);

dicarbamoylcaprolactams, preferably 1,1'-carbonyl-biscaprolactam;

glyoxal, dialdehyde starches and TEMPO-oxidized starches;

diepoxides;

compounds comprising an epoxide functional group and a halogen functional group, preferably epichlorohydrin;

organic diacids, preferably succinic acid, adipic acid, glutaric acid, oxalic acid, malonic acid or maleic acid, and the corresponding anhydrides;

oxychlorides, preferably phosphorus oxychloride;

trimetaphosphates, preferably sodium trimetaphosphate;

alkoxysilanes, preferably tetraethoxysilane; and any mixtures of these compounds.

In one preferred embodiment of the invention, the coupling agent is a diisocyanate, in particular methylene diphenyl diisocyanate (MDI).

When the composition contains a coupling agent, said coupling agent is preferably present in an amount of 0.1 to 15 parts by dry weight, preferably in an amount of 0.2 to 9 parts by dry weight and in particular in an amount of 0.5 to 5 parts by dry weight, per 100 parts by dry weight of ester of the starchy material.

The composition according to the invention may also comprise a compatibilizing agent for compatibilization between the ester of the starchy material and the non-starchy polymer. This could be, for example, polymers or else surfactants of low molecular weight or polymeric surfactants, having within them at least one relatively hydrophilic part and at least one relatively hydrophobic part. Mention may in particular be made of proteins, block copolymers, and synthetic polymers functionalized by grafting of maleic anhydride, etc.

The composition according to the invention may comprise other additional products.

Mention may in particular be made of the possible addition of fillers, fibers or additives, listed in particular below, which may be incorporated into the thermoplastic or elastomeric composition of the present invention. These may be products targeted at yet further improving its physicochemical properties, in particular its processing behavior and its durability, or else its mechanical, thermal, conductive, adhesive or organoleptic properties.

The additional product may be an agent that improves or adjusts mechanical or thermal properties chosen from inorganic materials, salts and organic substances. The additional products may be nucleating agents, such as talc, agents that improve the impact strength or scratch resistance such as calcium silicate, shrinkage control agents such as magnesium silicate, agents that trap or deactivate water, acids, catalysts, metals, oxygen, infrared radiation or UV radiation, hydrophobizing agents, such as oils and fats, flame retardants and fire retardants such as halogenated derivatives, antismoke agents or inorganic or organic reinforcing fillers, such as calcium carbonate, talc, plant fibers, especially coir, sisal, cotton, hemp and flax fibers, glass fibers or Kevlar fibers.

The additional product may also be an agent that improves or adjusts the conductive or insulating properties with regard to electricity or heat or the impermeability, for example toward air, water, gases, solvents, fatty substances, gasolines, aromas or fragrances, chosen in particular from inorganic materials, salts and organic substances, in particular from agents which conduct or dissipate heat, such as metal powders and graphites.

The additional product may also be an agent that improves the organoleptic properties, in particular:

scented properties (fragrances or odor-masking agents);

optical properties (brighteners, whiteners, such as titanium dioxide, dyes, pigments, dye enhancers, opacifiers, mattifying agents such as calcium carbonate, thermochromic agents, phosphorescence and fluorescence agents, metalizing or marbling agents and antifogging agents);

sound properties (barium sulfate and barites); and tactile properties (fatty substances).

The additional product may also be an agent that improves or adjusts the adhesive properties, in particular the properties of adhesion with regard to cellulose materials, such as paper or wood, metal materials, such as aluminum and steel, glass or ceramic materials, textile materials and inorganic materials, such as, in particular, pine resins, rosins, ethylene/vinyl alcohol copolymers, fatty amines, lubricants, mold-release agents, antistatic agents and antiblocking agents.

The additional product may be an agent which improves the durability of the material or an agent for controlling its (bio)degradability, chosen in particular from hydrophobicizing or beading agents, such as oils and fats, corrosion inhibitors, preservatives such as in particular organic acids, in particular acetic acid or lactic acid, antimicrobial agents, such as Ag, Cu and Zn, decomposition catalysts such as oxo catalysts, and enzymes such as amylases.

The additional product may be a nanoscale product that makes it possible to considerably reduce the sensitivity to water and to water vapor of the final thermoplastic or elastomeric composition obtained, in comparison with those from the prior art comprising starch. The nanoscale product may be added both for improving the processing and forming behavior of the composition according to the invention, but also its mechanical, thermal, conductive, adhesive or organoleptic properties. Advantageously, the nanoscale product is composed of particles having at least one dimension of between 0.5 and 200 nanometers, preferably of between 0.5 and 100 nanometers and more preferably still of between 1 and 50 nanometers. This dimension may in particular be between 5 and 50 nanometers.

The nanoscale product may be of any chemical nature and may optionally be deposited on or attached to a support. It may be chosen from natural or synthetic lamellar clays, organic, inorganic or mixed nanotubes, organic, inorganic or mixed nanocrystals and nanocrystallites, organic, inorganic or mixed nanobeads and nanospheres, in a separate form, as bunches or as agglomerates, and any mixtures of these nanoscale products. As lamellar clays, also referred to as calcium and/or sodium silicates/phyllosilicates, mention may especially be made of the products known under the names of montmorillonite, bentonite, saponite, hydrotalcite, hectorite, fluorohectorite, attapulgite, beidellite, nontronite, vermiculite, halloysite, stevensite, manasseite, pyroaurite, sjogrenite, stichtite, barbertonite, tacovite, desaultelsite, motucoreaite, honessite, mountkeithite, wermlandite and glimmer. Such lamellar clays are already commonly available commercially, for example from Rockwood under the Nanosil and Cloisite trade names. Mention may also be made of hydrotalcites, such as the Pural products from Sasol.

The nanotubes that may be used within the context of the invention have a tubular structure with a diameter of the order of a few tenths of a nanometer to several tens of nanometers. Some of these products are already commercially available, such as carbon nanotubes, for example from Arkema under the Graphistrength and Nanostrength trade names and from Nanocyl under the Nanocyl, Plasticyl, Epocyl, Aquacyl and Thermocyl trade names. Such nanotubes may also be cellulose nano-fibrils, with a diameter of approximately 30 nanometers for a length of a few microns, which are composed of natural fibers of wood cellulose and may be obtained by separation and purification starting from the latter.

The nanocrystals or nanocrystallites may especially be obtained by crystallization, within the thermoplastic or elastomeric composition itself or not, of materials in a very dilute solvent medium, it being possible for said solvent to be a constituent of the composition in accordance with the invention. Mention may be made of nanometals, such as iron or silver nanoparticles of use as reducing or antimicrobial agents and oxide nanocrystals known as agents for improving the scratch resistance. Mention may also be made of synthetic nanoscale talcs that may be obtained, for example, by crystallization from an aqueous solution. Mention may also be made, as such, of amylose/lipid complexes with structures of Vh(stearic), Vbutanol, Vglycerol, Visopropanol or Vnaphthol type, with a width or length of 1 to 10 microns, for a thickness of approximately ten nanometers. They may also be complexes with cyclodextrins, of similar characteristics. Finally, they may be nucleating agents for polyolefins capable of crystallizing in the form of nanoscale particles, such as sorbitol derivatives, for instance dibenzylidene sorbitol (DBS), and the specific alkylated derivatives thereof.

The nanoscale product that can be used may be provided as individual particles of nanobead or nanosphere type, that is to say in the form of pseudospheres with a radius of between 1 and 500 nanometers, in a separate form, as bunches or as agglomerates. Mention may in particular be made of the carbon blacks commonly used as fillers for elastomers and rubbers. These carbon blacks comprise primary particles which a size which may be between approximately 8 nanometers (furnace blacks) and approximately 300 nanometers (thermal blacks) and generally exhibit standard oil absorption capacities of between 40 and 180 cc per 100 grams for STSA specific surface areas of between 5 and 160 m$^2$ per gram. Such carbon blacks are sold in particular by Cabot, Evonik, Sid Richardson, Columbian and Continental Carbon.

Mention may also be made of hydrophilic or hydrophobic and precipitated or fumed (pyrogenic) silicas, such as those used as flow agents for powders or fillers in "green" tires. Such silicas are sold in particular in the form of powders or of dispersions in water, in ethylene glycol or in resins of acrylate or epoxy type by Grace, Rhodia, Evonik, PPG and Nanoresins AG.

Mention may also be made of nanoprecipitated calcium carbonates, or metal oxides (titanium dioxide, zinc oxide, cerium oxide, silver oxide, iron oxide, magnesium oxide, aluminum oxide, etc.) rendered nano-scale, for example by combustion, such as the products sold by Evonik under the Aeroxide or Aerodisp names, or by acid attack, such as the products sold by Sasol under the Disperal or Dispal names.

Finally, mention may be made of proteins precipitated or coagulated in the form of nanoscale beads. Finally, mention may be made of polysaccharides, such as starches, placed in the nanospherical form, such as the crosslinked starch nanoparticles with a size of between 50 and 150 nanometers sold under the Ecosphere name by Ecosynthetix, or else the starch acetate nanoparticles Cohpol C6N100 from VTT, or else nanobeads synthesized directly in the nanoscale state, for example those of polystyrenemaleimides from Topchim.

The optional incorporation of any additional product may be carried out by physical mixing under cold conditions or at low temperature, but preferably by kneading under hot conditions at a temperature greater than the glass transition temperature of the composition. This kneading temperature is advantageously between 60 and 200° C., better still between 100 and 180° C. This incorporation may be carried out by thermomechanical mixing, batchwise or continuously and in particular in line. In this case, the mixing time may be short, from a few seconds to a few minutes.

The composition according to the invention preferably exhibits a complex viscosity, measured on a rheometer of Physica MCR 501 or equivalent type, of between 10 and $10^6$ Pa·s, for a temperature of between 100 and 200° C. For the purpose of the processing thereof by injection molding, for example, its viscosity at these temperatures is preferably situated in the lower part of the range given above and the composition is then preferably a hot-melt composition within the meaning specified above.

The thermoplastic or elastomeric compositions according to the invention additionally exhibit the advantage of being virtually or completely insoluble in water, of hydrating with difficulty and of retaining good physical integrity after immersion in water, saline, oxidizing, acid or alkaline solutions or else more complex aqueous media such as biological media for instance saliva, sweat, and digestive juices. Unlike the thermoplastic compositions with high starch contents of the prior art, the composition according to the invention advantageously exhibits stress/strain curves that are characteristic of a ductile material and not of a material of brittle type.

Its tensile mechanical properties may especially be evaluated according to the following protocol:
Measurement of the Mechanical Properties:

The tensile mechanical characteristics of the various compositions are determined according to standard NF T51-034 (Determination of the tensile properties) by using a Lloyd Instruments LR5K test bench, a pull rate of 50 mm or 300 mm/min and standardized test specimens of H2 type.

The elongation at break and the corresponding maximum tensile strength are noted, for each of the alloys, from the stress/strain curves (strength=f(elongation)) obtained at a drawing rate of 50 or 300 mm/min.

The elongation at break, measured for the compositions of the present invention for a drawing rate of 50 mm/min, is generally between 10% and 1000%. It is generally greater than 20%, preferably greater than 40%, better still greater than 60%. This elongation at break may advantageously be at least equal to 70%, in particular at least equal to 80%. Remarkably, it may even reach or exceed 100%, or even 200%, or even much more (300% to 900%, or even 1000%). According to one advantageous variant, this elongation at break is at least equal to 70% and less than 500% and in particular between 80% and 480%.

The maximum tensile strength of the compositions of the present invention, also measured at a drawing rate of 50 mm/min, is generally between 4 MPa and 50 MPa. It is generally greater than 4 MPa, preferably greater than 5 MPa, better still greater than 6 MPa. Remarkably, it may even reach or exceed 7 MPa, or even 10 MPa, or even much more (15 MPa to 50 MPa). According to one advantageous variant, this maximum tensile strength is at least equal to 7 MPa and less than 50 MPa, and in particular between 10 MPa and 45 MPa.

The composition according to the present invention may additionally exhibit the advantage of being composed of essentially renewable raw materials and of being able to exhibit, after adjustment of the formulation, the following properties of use in multiple applications in the plastics industry or in other fields:

appropriate thermoplasticity, appropriate melt viscosity and appropriate glass transition temperature, within the usual ranges of values known for standard polymers ($T_g$ from −120° C. to +150° C.), making processing possible by virtue of the existing industrial plants conventionally used for customary synthetic polymers;

sufficient miscibility with a great variety of polymers of fossil origin or of renewable origin on the market or in development;

satisfactory physicochemical stability toward the processing conditions;

low sensitivity to water and to water vapor;

mechanical performance which is very markedly improved in comparison with the starch thermoplastic compositions of the prior art (flexibility, elongation at break, maximum tensile strength);

good barrier effects to water, water vapor, oxygen, carbon dioxide, UV radiation, fatty substances, aromas, gasolines and fuels;

opacity, translucency or transparency which can be adjusted according to the uses;

good printability and ability to be painted, in particular by inks and paints in aqueous phase;

controllable dimensional shrinkage;

highly satisfactory stability over time;

adjustable biodegradability and compostability; and good recyclability.

Another subject of the present invention is a process for preparing a thermoplastic or elastomeric composition as described previously in all its variants, said process comprising the following steps:

(i) selection of at least one ester of a starchy material with a DS between 1.6 and 3, preferably between 1.8 and 3 and more preferably between 2.0 and 2.9;

(ii) selection of at least one polymer other than starch; and (iii) preparation, preferably by thermomechanical mixing under hot conditions, of a thermoplastic or elastomeric composition.

The thermoplastic or elastomeric composition according to the invention may be used as is or as a mixture with synthetic polymers, artificial polymers or polymers of natural origin. It may also comprise polymers known for being biodegradable or compostable within the meaning of the standards EN 13432, ASTM D4600 and ASTM 6868, or materials corresponding to these standards, such as PLA, PCL, PBS, PBAT and PHA.

The composition according to the invention may especially be non-biodegradable (degree of biodegradability of less than 5%, preferably close to 0%) and/or preferably non-compostable within the meaning of the EN or ASTM standards mentioned above. It is possible to adjust the service life and the stability of the composition according to the invention by adjusting, in particular, its affinity for water so as to be suitable for the expected uses as material and for the methods of reuse/recycling envisaged at the end of life.

The thermoplastic or elastomeric composition according to the present invention advantageously contains at least 15%, preferably at least 30%, in particular at least 50%, better still at least 70%, or even more than 80% of carbon of renewable origin within the meaning of the ASTM D6852 standard, with respect to all of the carbon present in the composition. This carbon of renewable origin is essentially that constituting the ester of the starchy material necessarily present in the composition according to the invention but may also advantageously be, via a judicious choice of the constituents of the composition, that present in the optional plasticizer or any other constituent of the composition, when they originate from renewable natural resources such as those defined preferentially above.

It can in particular be envisaged to use the compositions according to the invention as films, seals or barrier products to oxygen, to carbon dioxide, to aromas, to fuels and/or to fatty substances, alone or in multilayer structures obtained by coextrusion for the food packaging field in particular.

They may also be used to increase the hydrophilic nature, the aptitude for electrical conduction, the permeability to water and/or to water vapor, or the resistance to organic solvents and/or fuels, of synthetic polymers within the context, for example, of the manufacturing of printable electronic labels, films or membranes, of textile materials, of containers or tanks, or else of improving the adhesive properties of hot-melt or heat-sealing films or sealing films on hydrophilic supports such as wood, glass or skin.

It should be noted that the relatively hydrophilic nature of the thermoplastic or elastomeric composition according to the invention considerably reduces the risks of bioaccumulation in the adipose tissues of living organisms and therefore also in the food chain.

Said composition may be in pulverulent, granular or bead form. It may constitute, as is, a masterbatch or the matrix of a masterbatch, intended to be diluted in a biosourced or non-biosourced matrix.

It may also constitute a plastic raw material or a compound that can be used directly by an equipment manufacturer or a custom molder for the preparation of plastic or elastomeric articles.

It may also constitute, as is, an adhesive, especially of hot-melt type, or a matrix for formulation of an adhesive, in particular of hot-melt type.

It may constitute some or all of a gum base or of the matrix of a gum base, in particular for chewing gum or else of a resin, co-resin or nanofiller, in particular that are biosourced, that can be used in industry, in particular in the rubber and elastomer industry, including tires, road bitumens or other bitumens, in the ink industry, varnish industry, paint industry, paper and board industry, and the industry of woven and non-woven products.

One subject of the present invention is moreover the use of a composition according to the invention, in particular an elastomeric composition, for the preparation of a gum base for chewing gum.

Another subject of the present invention is a gum base for chewing gum that contains a composition according to the invention, advantageously in an amount between 5 and 50%, preferably between 10 and 45% and in particular between 10 and 40%.

Another subject of the present invention is the use of a composition according to the invention, in particular an elastomeric composition, for the preparation of a part or a piece of equipment for the transport industry, in particular the automotive, aeronautical, railroad or ship building industry, for the electrical appliance, electronic appliance or electrical household appliance industry or for the sport and leisure industry.

It may be, for example, treads or carcasses of tires, belts, cables, pipes, seals and molded parts, teats, gloves, soles of shoes or coated fabrics.

Finally, the composition according to the invention may optionally be used for preparing thermoset resins (duroplasts) by irreversible extensive crosslinking, said resins thus definitively losing all thermoplastic or elastomeric nature.

The invention also relates to a plastic, an elastomeric material or an adhesive material comprising the composition of the present invention or a finished or semifinished product obtained therefrom.

EXAMPLE 1

Preparation of Compositions According to the Invention

Preparation of the Compositions

Used for this example are:
- as ester of starchy material, an acetate of potato starch having a DS of esters of 2.7 and denoted hereinbelow by "ACET 1";
- as plasticizer of this ester of starchy material, a liquid composition of glycerol triacetate (triacetin);
- as polymer other than starch, a thermoplastic polymer, in this case PLA (polylactic acid);
- as other polymer other than starch, an elastomeric polymer of polyether TPU type sold under the name ESTANE® 58887 by Noveon;
- as other polymer other than starch, a low-density polyethylene (LDPE);
- as other polymer other than starch, a maleic anhydride-grafted polyethylene sold under the name BONDYRAM® 4001 by Polyram;
- as coupling agent, methylene diphenyl diisocyanate (MDI) sold under the name Suprasec 1400 by Huntsman.

Firstly, produced in several steps is a composition containing, by weight:
- 30% of ACET 1 ester of starchy material;
- 20% of triacetin; and
- 50% of PLA.

During the first step, 60 parts of ACET 1 ester and 40% parts of triacetin are mixed in a Hobart type mixer for 5 minutes. After crumbling the resulting mixture, it is introduced, via the main feed throat, into a HAAKE type single-screw extruder having a diameter (D) of 19 mm and a length of 25 D, according to the following temperature profile, respectively for the 4 barrels: 40° C., 140° C., 130° C. and 110° C., at a rotational speed of 80 rpm.

The rod of plasticized ACET 1 ester of starchy material is then granulated.

Next, still in a Hobart type mixer and for 5 minutes, these granules of plasticized ACET 1 ester ("ACET 1 pl") are mixed with the PLA in a weight ratio of 50/50.

Next, still via the main feed throat, the resulting ACET 1 pl/PLA mixture is introduced into the HAAKE single-screw extruder described above according to the following temperature profile, respectively for the 4 barrels: 40° C., 140° C., 130° C. and 110° C. at a rotational speed of 40 rpm.

It appears that this mixture is in accordance with that which may be expected from a conventional thermoplastic material capable of being introduced, assayed and converted in conventional conversion equipment such as an extruder.

The resulting extruded composition (hereinbelow "COMP 1"), is in the form of a rod of cream color which is continuous, can be drawn under its weight and which appears visually homogeneous. To touch, it exhibits good flexibility but a rather slow elastic response of uncrosslinked rubber type.

It has the following tensile mechanical characteristics, measured in accordance with the protocol described previously in the "Measurement of the mechanical properties" paragraph and for a drawing rate of 50 mm/min:
- elongation at break: 23%;
- maximum tensile strength: 16 MPa.

Furthermore, it has a degree of biodegradability, measured in accordance with the protocol described previously in the "Measurement of the degree of biodegradation according to ISO 14851" paragraph, the average value of which is very low, namely less than 15% whereas under the same conditions, microcrystalline cellulose has a degree of biodegradability close to 90%.

PLAs, PHAs or other polymers labeled as biodegradable, when treated on their own under these conditions, themselves have degree of biodegradability values that are generally greater than 50%.

The composition COMP 1 described above, in accordance with the present invention, was then used within extruded compositions ("COMP 2", "COMP 3" and "COMP 4"), also in accordance with the present invention, these compositions respectively containing, by weight:
- COMP 2: 100 parts of COMP 1+2 parts of coupling agent (MDI);
- COMP 3: 50 parts of COMP 1+50 parts of polyether TPU ESTANE® 58887+2% of MDI; and
- COMP 4: 50 parts of COMP 1+45 parts of low-density polyethylene (LDPE)+5% of maleic anhydride grafted PE in BONDYRAM® 4001.

They have, under the same measurement conditions as those used for the composition COMP 1, the mechanical characteristics listed in the table below, with, as control compositions, a composition consisting solely of LDPE or solely of acrylonitrile-butadiene-styrene copolymer ("ABS").

| COMPOSITION | Elongation at break | Maximum tensile strength |
|---|---|---|
| COMP1 | 23% | 16 MPa |
| COMP 2 | 130% | 18 MPa |
| COMP 3 | 207% | 17 MPa |
| COMP 4 | 112% | 8 MPa |
| LDPE (control) | 250% | 8 MPa |
| ABS (control) | 40% | 32 MPa |

These results show overall that the tensile mechanical characteristics of the composition COMP 1 in accordance with the invention, may still be significantly improved by addition of a small amount of coupling agent ("COMP 2") and/or by mixing with polymers respectively of the polyether TPU ("COMP 3") or polyolefin ("COMP 4") type.

The Applicant has more generally observed that, remarkably:
- although the composition COMP 3 according to the invention contained a very high proportion of COMP 1, it had thermal and mechanical characteristics which were comparable to those of commercial "engineering" thermoplastic elastomers such as those of TPU or ABS type;
- the compositions COMP 2 and COMP 4 according to the invention that contain, however, very high proportions of COMP 1, had, despite a relative shortfall in elongation at break, a behavior close to commercial polymers known as "commodity polymers" of LDPE type.

EXAMPLE 2

Use of Elastomeric Compositions in Accordance with the Invention in the Preparation of Chewing Gums Within the context of this example, the possibility of using compositions according to the invention to at least partially replace a gum base based on a synthetic polymer used for the preparation of chewing gums is evaluated.

2.1: Raw Materials

Used as main raw materials for this example are:
- as esters of starchy material, respectively:
  - an acetate of a maltodextrin derived from waxy cornstarch (maltodextrin GLUCIDEX® 2 sold by the Applicant), said acetate having a DS of esters of around 2.7 (denoted hereinbelow by "ACET 2");
  - an acetate of a fluidized cornstarch, in this case the starch CLEARGUM® MB80 sold by the Applicant, said acetate having a DS of esters of around 2.5 (denoted hereinbelow by "ACET 3");

an acetate of potato starch (DS of 0.45), then grafted with epsilon-caprolactone, the resulting ester of starchy material having a total DS of esters of around 2.6 (denoted hereinbelow by "ACET 4"); and an acetate of potato starch having a DS of esters of around 2.6, said acetate moreover being hydroxypropylated with an MS (degree of molar substitution) of around 0.4 (denoted hereinbelow by "ACET 5");

as plasticizer of these esters of starchy material, triacetin (denoted hereinbelow by "PLAST 1"); and as synthetic polymer, an elastomeric composition (gum base) comprising, in total, around 52% by weight of a mixture of polymers other than starch, which mixture is constituted of polyvinyl acetate (PVAc), rosin esters, butadiene/styrene copolymers and polyisobutylene, the balance to 100% being mainly composed of calcium carbonate, paraffin wax and emulsifier. The polyisobutylene and butadiene/styrene elastomers constitute around one third, that is to say 14% of the 52% of polymers of the gum base.

2.2: Plasticization of the Esters of Starchy Material

In a Küstner Z-arm kneader heated at 110° C., each of the esters of starchy material ACET 2 to ACET 5 are heated with the plasticizer PLAST 1, in the following respective weight proportions:

70% of ACET 2+30% of PLAST 1,
60% of ACET 3+40% of PLAST 1,
60% of ACET 4+40% of PLAST 1,
60% of ACET 5+40% of PLAST 1.

After kneading for 50 minutes, the following are observed:
very good homogeneity of the mixtures based on esters ACET 2 and ACET 5,
a lower homogeneity of the mixtures based on the ester ACET 3 (presence of a few white spots after kneading) and of the ester ACET 4 (presence of gelled particles after kneading),
good elasticity of the mixtures, especially that based on the ester ACET 4.

2.3: Incorporation of the Plasticized Esters of Starchy Material into the Gum Base In the same kneader as that described above, 70% by weight of elastomeric composition (gum base) as described previously is mixed, still at 110° C. and for 30 minutes, with 30% by weight, respectively, of each of the plasticized esters of starchy material resulting from point 2.2, denoted hereinbelow respectively by ACET 2 pl, ACET 3 pl, ACET 4 pl and ACET 5 pl.

It is observed that all of the four plasticized ester of starchy material/gum base mixtures are homogeneous which illustrates a good compatibility between the synthetic polymeric material that constitutes the gum base and each of the previously plasticized acetates of starchy material ACET 2 pl to ACET 5 pl.

2.4: Preparation of Chewing Gums from a Base Gum Combined, or not, with a Plasticized Ester of Starchy Material Chewing gum compositions are prepared according to the formula below.

2.4.1: Formula

| Component | Proportion (%) |
|---|---|
| Gum base combined or not with a plasticized ester of starchy material | 35.0 |
| Sorbitol powder NEOSORB ® P650 | 42.45 |
| Xylitol powder XYLISORB ® P90 | 5.0 |
| Mannitol 60 | 5.0 |
| Maltitol syrup LYCASIN ® 80/55 | 10.0 |
| SILESIA powdered mint flavoring | 0.2 |
| SILESIA liquid mint flavoring | 1.5 |
| Menthol | 0.5 |
| Aspartame | 0.2 |

2.4.2: Procedure

Introduce the gum base, combined or not with a plasticized ester of starchy material, into an IKA (IKA VISC MKD 0.6—MESSKNETER H60) Z-arm kneader preheated to 50° C. Add half of the powdered sorbitol. Knead for 2 minutes.

Add the maltitol syrup, knead for 2 minutes.

Add the mannitol and the powdered xylitol, knead for 2 minutes.

Add the other half of the powdered sorbitol and the glycerol, knead for 2 minutes.

Add the powdered flavoring, the menthol and the aspartame, knead for 1 minute.

Add the liquid flavoring, knead for 1 minute.

Empty the kneader, roll the resulting mixture into a strip having a thickness of 5 mm and cut it into "sticks" having a length of 30 mm and a width of 18 mm.

2.4.3 "Gum Base" Components Tested

Various "gum base" components GUM 1 to GUM 5 are tested (amount for introduction into the chewing gum formula: 35%—cf. above) composed respectively:

GUM 1: 100% by weight of gum base=CONTROL

GUM 2: 70% by weight of gum base+30% by weight of plasticized acetate of starchy material ACET 2 pl;

GUM 3: 70% gum base/30% ACET 3 pl;

GUM 4: 70% gum base/30% ACET 4 pl; and

GUM 5: 70% gum base/30% ACET 5 pl.

2.4.4 Measurement of the Hardness of the Sticks

The hardness, expressed in Newtons, of the sticks prepared is measured using an INSTRON 4500 machine (measurement cell: 100 Newtons; cylindrical punch with a diameter of 3.9 mm; rate of travel: 50 mm/min). The sticks are measured either straight after their preparation (DO) and at various temperatures (45° C., 35° C. or 20° C.) or after, respectively, 1, 8 and 15 days of storage inside an aluminum packaging that is itself placed in a climatic chamber (temperature: 20° C.; relative humidity (RH): 50%).

The results, expressed in Newtons, are given in the table below:

| Gum base | D0-45° C. | D0-35° C. | D0-20° C. | D1-20° C. 50% RH | D8-20° C. 50% RH | D15-20° C. 50% RH |
|---|---|---|---|---|---|---|
| GUM 1 = CONTROL | 3.0 | 7.2 | 17.8 | 25.9 | 25.7 | 27.7 |
| GUM 2 | 2.4 | 4.5 | 10.9 | 16.6 | 20.5 | 20.7 |
| GUM 3 | 1.9 | 4.5 | 9.8 | 17.2 | 19.5 | 20.0 |
| GUM 4 | 1.3 | 2.7 | 7.7 | 15.1 | 18.3 | 19.9 |
| GUM 5 | 1.9 | 4.0 | 11.2 | 16.0 | 17.9 | 18.3 |

Generally, the chewing gums in which 30% of the gum base is substituted by a plasticized ester of starchy material:
are perfectly homogeneous apart from those obtained with the gum base GUM 4 for which the residual presence of a few scattered particles of plasticized ester of starchy material ACET 4 pl is observed; and
are less hard and remain less hard than the control. Those in which the INSTRON texture is closest to the control are those prepared with the gum base GUM 2 containing 30% of plasticized ester of starchy material ACET 2 pl, namely 30% of an acetate of GLUCIDEX® 2 plasticized by triacetin.

Organoleptic tests have shown that, overall, the texture and the taste of these chewing gums are perfectly acceptable, those prepared from the gum base GUM 2 also prove, during such tests, to be the closest to the control chewing gums for which the gum base is not combined with an ester of starchy material. The results of this example 2 overall show that the esters of starchy material such as the plasticized products ACET 2, ACET 3, ACET 4 and ACET 5 may be used perfectly well in the preparation of chewing gums as an at least partial but significant substitution (from a few % to at least 30% by weight) for a conventional gum base of synthetic nature.

EXAMPLE 3

Preparation of a Composition According to the Invention Based on a Plasticized Ester of Starchy Material and on a Polymer of Ester TPU Type Preparation of the Composition
Used for this example are:
as plasticized ester of starchy material, the acetate of maltodextrin ACET 2 as described in example 2;
as plasticizer, benzyl alcohol in an amount of 15 parts by weight per 100 parts by weight of said ester;
as polymer other than starch, a polymer of ester TPU type sold under the name ESTANE® 58447 by Noveon;
as coupling agent, methylene diphenyl diisocyanate (MDI) sold under the name Suprasec 1400 by Huntsman.

Under the general conditions of example 1, a composition in accordance with the invention (hereinbelow "COMP 5") is produced containing:
50 parts of ESTANE® 58447 polymer;
50 parts by weight of plasticized ACET 2 ester; and
1 part by weight of MDI.

This composition in COMP 5 has the following tensile mechanical characteristics, measured in accordance with the protocol described previously in the "Measurement of the mechanical properties" paragraph and for a drawing rate of 50 mm/min:
elongation at break: 80%;
maximum tensile strength: 14 MPa.

The composition in COMP 5, although containing a high proportion of ester of starchy material, exhibits a behavior close to certain performances of the polymer of "impact polystyrene" type or of "EVA for agricultural films" type.

The invention claimed is:
1. An elastomeric composition comprising:
at least 0.5% and at most 99.95% by weight of an acetate of a starchy material having a degree of substitution (DS) of esters between 2.6 and 3; and
at least 0.05% by weight and at most 99.5% by weight of a polymer other than starch,
wherein the elastomeric composition has a degree of biodegradability according to the ISO 14851 standard of less than 50%, and
wherein the polymer other than starch is an elastomeric polymer selected from the group consisting of natural rubbers and derivatives thereof, polyisobutylenes, polyisoprenes, butadiene-styrene copolymers (SBR), butadiene-acrylonitrile copolymers, hydrogenated butadiene-acrylonitrile copolymers, acrylonitrile-styrene-acrylate copolymers (ASA), ethylene/methyl acrylate copolymers (EAM), thermoplastic polyurethanes (TPU) of ether or ester-ether type, polyethylenes or polypropylenes functionalized with silane, halogenated, acrylic or maleic anhydride units, EDM and EPDM, thermoplastic elastomers derived from polyolefins (TPO), styrene-butylene-styrene copolymers (SBS) and styrene-ethylene-butylene-styrene copolymers (SEBS) functionalized with maleic anhydride units, and any mixtures of these polymers.

2. The composition as claimed in claim 1, wherein the acetate of starchy material has a degree of biodegradability according to the ISO 14851 standard of less than 50%.

3. The composition as claimed in claim 1, wherein the polymer other than starch has a degree of biodegradability according to the ISO 14851 standard of less than 50%.

4. The composition as claimed in claim 1, wherein the polymer other than starch has a solubility in water, at 20° C., of less than 10%.

5. The composition as claimed in claim 1, comprising:
from 10 to 70% by weight of the acetate of starchy material; and
from 30 to 90% by weight of a polymer other than starch.

6. The composition as claimed in claim 1, containing:
from 50 to 99% by weight of the acetate of starchy material; and
from 1 to 49% by weight of a polymer other than starch.

7. The composition as claimed in claim 1, said composition comprising:
from 5 to 49% by weight, of the acetate of starchy material, and from 50 to 95% by weight of a polymer other than starch.

8. The composition as claimed in claim 1, wherein the acetate of the starchy material is an acetate of water-soluble or organomodified starch, an acetate of dextrin or an acetate of maltodextrin.

9. The composition as claimed in claim 1, further containing a plasticizing agent, said plasticizing agent being present in an amount of 1 to 150 parts by dry weight per 100 parts by dry weight of acetate of the starchy material.

10. The composition as claimed in claim 1, wherein a plasticizing agent is present in an amount of 25 to 120 parts by dry weight, per 100 parts by dry weight of acetate of the starchy material.

11. The composition as claimed in claim 1, said composition comprising:
- from 10 to 60% by weight of an acetate of a starchy material;
- from 40 to 85% by weight of a polymer other than starch; and
- from 5 to 30% by weight of a plasticizing agent.

12. The composition as claimed in claim 1, said composition having:
- an elongation at break at least equal to 70% and less than 500%; and
- a tensile strength at least equal to 7 MPa and less than 50 MPa.

13. A gum base for chewing gum comprising from 5 to 50% of a composition according to claim 1.

14. The gum base as claimed in claim 13, comprising from 10 to 40% of said composition.

\* \* \* \* \*